UNITED STATES PATENT OFFICE.

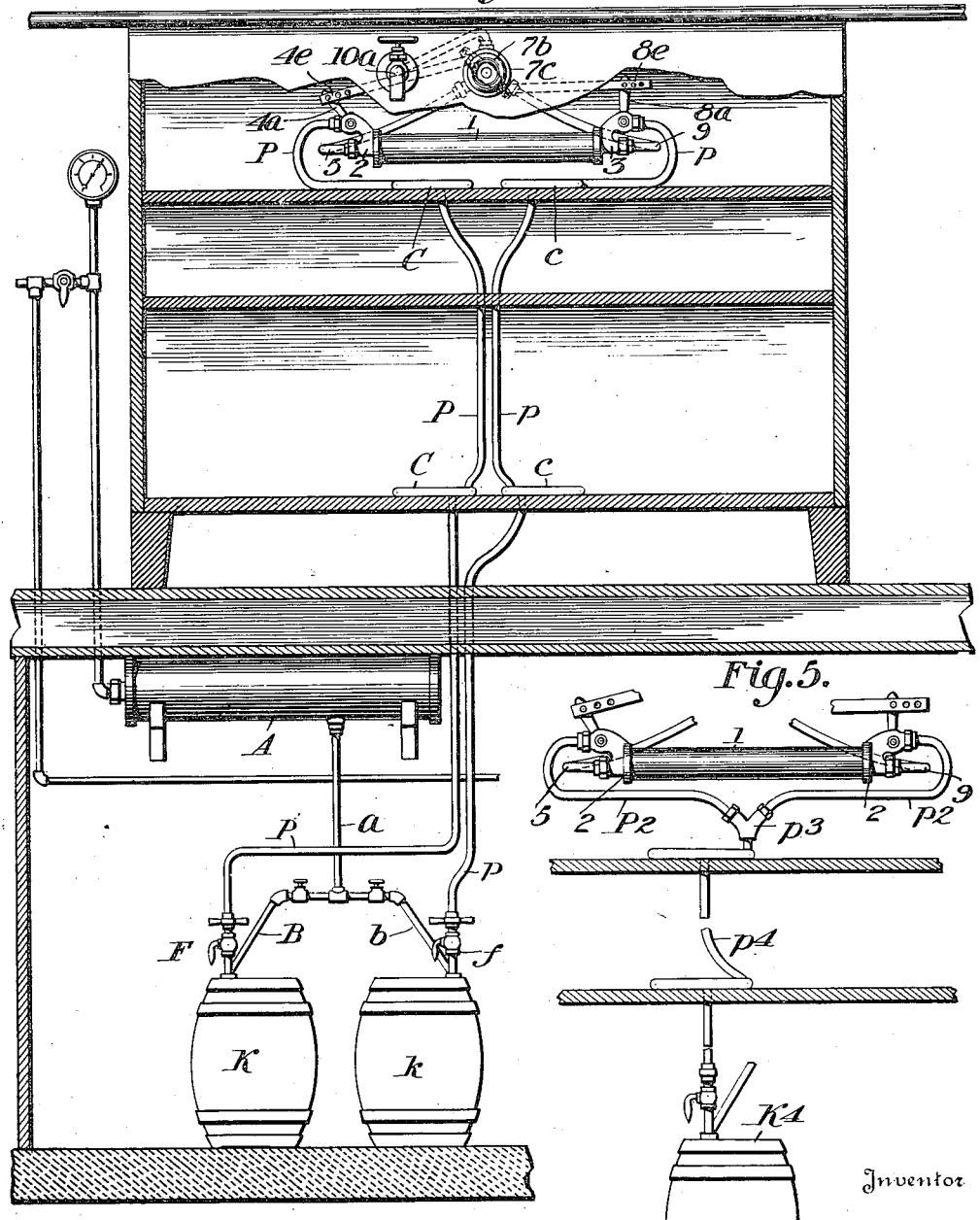

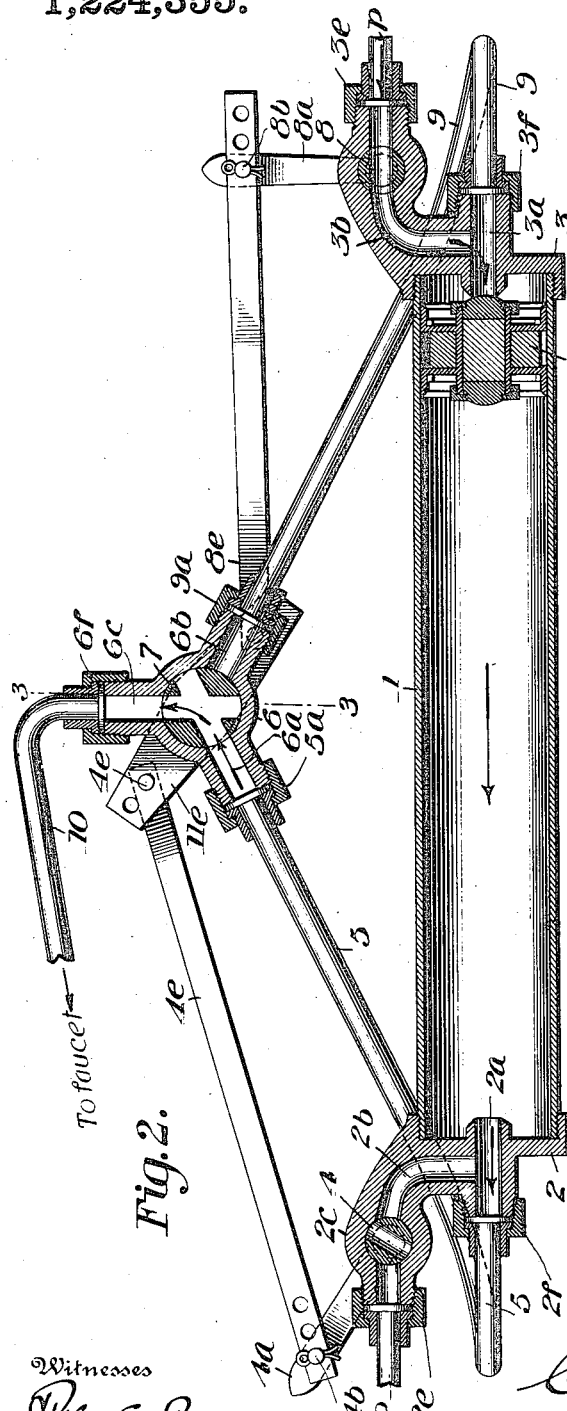

CHARLES F. BROWN, OF NEW YORK, N. Y., ASSIGNOR TO UNIVERSAL LIQUID REGISTER COMPANY, OF NEW YORK, N. Y., A CORPORATION OF NEW YORK.

LIQUID MEASURING AND DISPENSING APPARATUS.

1,224,355.  Specification of Letters Patent.  Patented May 1, 1917.

Application filed February 19, 1915. Serial No. 9,341.

*To all whom it may concern:*

Be it known that I, CHARLES F. BROWN, a citizen of the United States, residing at New York, in the county of New York and State of New York, have invented certain new and useful Improvements in Liquid Measuring and Dispensing Apparatus; and I hereby declare that the following is a full, clear, and exact description thereof, reference being had to the accompanying drawings, which form part of this specification.

This invention is a novel improvement in liquid dispensing and measuring devices; and its object is to provide a device which can be economically used in connection with the present known dispensing apparatus and can be readily installed therewith or added thereto with very little alteration in the customary arrangement of pipes used in the latter; and without impairing the ice box or cooler, or altering the external appearance of the apparatus. My invention enables the liquids to be measured as they are dispensed and will require a great deal less piping than the heretofore known dispensing and measuring devices. By my invention I also provide a device which will be efficient and reliable in operation, and by which, if desired, different liquids can be drawn alternately from the same faucet; so that my device can be used to draw different liquids alternately in specified quantities; or can be used to dispense one liquid alternately from two containers.

The invention will be understood from the following detailed explanation of the device illustrated in the accompanying drawings; and the essential features thereof are summarized in the claim.

In said drawings:

Figure 1 is a sectional diagrammatical elevation of my measuring and dispensing device as applied to a dispensing and cooling apparatus such as is commonly used in places where beverages are retailed.

Fig. 2 is an enlarged sectional view of my dispensing and measuring device detached.

Fig. 3 is a detail sectional view of the controlling valve on the line 3—3, Fig. 2.

Fig. 4 is a detail sectional view on the line 4—4, Fig. 3.

Fig. 5 is a diagrammatic view illustrating how the device may be used for dispensing liquid at each operation from a single receptacle.

A liquid dispensing and cooling apparatus such as is ordinarily used by retailers, is conventionally illustrated in Fig. 1, and such apparatus is usually provided at its front with dispensing faucets which may be connected by pipes P, *p*, to liquid receptacles or containers K, *k*, ordinarily placed in the basement, and to which the pipes P, *p*, may be detachably connected by means of suitably valved couplings F, *f*. Said containers are customarily also connected by valved pipes B, *b*, with an air pipe *a* leading to a tank A containing compressed air, so that when the aforesaid valves are opened liquid will be forced from the receptacles K, *k*, through the pipes P, *p*, to the dispensing faucets, and will be cooled while passing through the coils C, *c*, in the pipes P, *p*, within the ice box or cooler. The aforesaid parts may be of any desired construction; and the arrangement and operation of the parts thus far described are well known and need no further explanation.

My liquid measuring device is adapted to be used in connection with such apparatus, and when so used, instead of connecting the extremities of the pipes P, *p*, direct to the faucets, I preferably detachably connect such pipes to opposite inlets of my measuring and dispensing device which is preferably constructed as follows:

A preferably cylindrical vessel 1 is closed at its opposite ends by means of heads 2, 3; which are substantially alike, and the description of one will practically explain the other. The head 2 is shown as having a central passage $2^a$ with which connects a branch or inlet passage $2^b$ that extends through an extension $2^c$ of the head, and in said extension is formed a seat for a valve 4 adapted to close or open passage $2^b$ and which valve may be operated by a stem or handle $4^a$ on its outer end.

To the outer end of extension $2^c$, beyond the valve 4, the pipe P may be connected by means of a coupling $2^e$ of the usual type, so when the valve 4 is opened liquid can pass from pipe P through passages $2^b$ and $2^a$ into the vessel 1.

Direct passage of liquid through vessel 1 from port $3^a$ to port $2^a$, or vice versa, is prevented by means of a suitable piston 12 slidably fitted within the cylinder 1 and adapted to divide the interior of the vessel into two non-communicating compartments, and to prevent communication or passage of liquid from the port 3ª to port 2ª, or vice versa. This piston however can be moved back and forth in the vessel by the flow and pressure of liquid therein. The outer end of passage 2ª may be connected by a coupling 2$^f$ with one end of a pipe 5; the other end of which pipe may be connected by a coupling 5ª with one port 6ª of a three-way valve casing 6.

The head 3 is provided with a central passage 3ª and a lateral inlet passage 3$^b$ controlled by a valve 8 which may be operated by an arm or a stem 8ª. Pipe $p$ may be connected to the outer end of passage 3$^b$ by means of a coupling 3$^e$, so that liquid can pass from pipe $p$ through passages 3$^b$ and 3ª into the vessel. The outer end of passage 3ª may be connected by a coupling 3$^f$ to one end of a pipe 9, the other end of which may be connected by a coupling 9ª to a port 6$^b$ of the three-way valve casing 6.

The third port 6$^c$ of this three-way valve casing may be connected by a coupling 6$^f$ to one end of a pipe 10, the other end of which may be connected to one of the faucets, as 10ª, to which one of the pipes P or $p$ is ordinarily connected.

The casing 6 has a base flange 6$^e$ by which it can be secured by screws to the inner wall of the ice box, as shown.

In the casing 6 is a three-way valve 7 which may be provided with a stem 7ª operable by a handle or hand-wheel 7$^b$ in the usual manner. This valve 7 is preferably tapered and the casing is conical so that a close fit may be readily maintained between the valve and its seat.

The stem 7ª is closely fitted in a sleeve bearing 11 to prevent water leaking from the ice box past the stem. The bearing 11 may be screwed into an opening in the ice box, and said bearing is provided on its outer end with a flange 11ª that can be fastened by screws to the ouside of the box. The bearing 11 as shown has a projecting parti-cylindrical flange 11$^c$ (Figs. 3 and 4) on its outer end, which flange is adapted to be engaged by a lug 7$^c$ on the stem 7ª to limit the rotative movements of the valve 7. When the valve 7 is turned until stop 7$^c$ abuts against one end of flanges 11$^c$, the valve will establish communication between the ports 6ª and 6$^c$ and close port 6$^b$ as indicated in Fig. 2; and when the valve 7 is turned until the stop 7$^c$ abuts against the other end of flange 11$^c$, the valve will establish communication between the ports 6$^b$ and 6$^c$ and close port 6ª.

Attached to the stem of the valve 7 is a cross bar or lever 11$^e$ to one arm of which is pivotally connected one end of a link 4$^e$ the other end of which link is pivotally connected as at 4$^b$ to the valve lever 4ª. To the other arm of lever 7$^e$ is pivotally connected one end of a link 8$^e$, the other end of which link is pivotally connected as at 8$^b$ to the handle 8ª of valve 8. The connections are such that when valve 7 is turned so as to establish communication between ports 6ª and 6$^c$ (as indicated in Fig. 2) it will through the described connections simultaneously operate the valves 4 and 8, so that valve 4 will close communication between pipe P and vessel 1, and valve 8 will establish communication between the pipe $p$ and vessel 1.

When the parts are in the position shown in Fig. 2 if faucet 10ª is opened liquid will flow from receptacle $k$ through pipe $p$ into the vessel 1 and will force the piston 12 to the left, and in so doing any liquid in the vessel, to the left of the piston, will be expelled through the passage 2ª into pipe 5 and pass through ports 6ª and 6$^c$, of valve 7, into pipe 10 and thence escape through the faucet 10ª; but when the liquid has moved piston 12 to the left hand end of the vessel the passage 2ª will be closed by the head of the piston 12 abutting against the inner end of said passage, and the further inlet of liquid from pipe $p$ will be stopped, and no more liquid will be expelled through pipes 5 and 10.

If the valve 7 be then reversed, so as to establish communication between the ports 6$^b$ and 6$^c$ and closing of port 6ª, such reversal will also simultaneously cause the closing of valve 8 and the opening of valve 4; then if faucet 10ª be opened liquid will flow from the receptacle K through pipe P into the vessel 1 forcing the piston 12 therein to the right; the piston expelling the liquid in the vessel, to the right of the piston, through the passage 3ª, pipe 9, valve 7 and pipe 10 to the faucet 10ª.

It will thus be seen that each time the valve 7 is shifted, to the right or left, an amount of liquid equal to the capacity of the vessel 1 will be discharged at the faucet when opened, such liquid being expelled from the cylinder by reason of the actuation of the piston 12 by the inflowing liquid from the pipe P or $p$.

Where the pipes P, $p$ are connected to separate containers, as indicated in Fig. 1, it will be obvious that if the containers hold different liquids they will be dispensed alternately upon successive operations of the valve 7; and like amounts of such liquids will be drawn alternately from the containers K, $k$. If the vessels K, $k$ contain the same liquid then such liquid can be dispensed in uniform quantities by successive operations of the valve 7.

If only one kind of liquid is to be dispensed the ports 2$^b$, 3$^b$ may be connected by short pipes P$^2$ to a Y $p^3$ which may be connected by a pipe $p^4$ to a container K$^4$, as indicated in Fig. 5.

It will be seen that my measuring device can be readily installed in the ordinary apparatus, and that the ends of the pipes P, p, instead of being connected to separate faucets may be detachably connected to the ends of the measuring device as described; and the three-way valve 10 connected to the faucet. Practically all the piping required in attaching my measuring device to the ordinary cooling apparatus is the short connecting pipes 5, 9, 10; and this means a saving of about 30 feet of such piping as compared with the measuring devices heretofore used in connection with ordinary cooling apparatus. Furthermore it can be therefore more quickly and cheaply installed.

What I claim is:

In combination a cylinder, a movable piston therein, heads provided with inlet and outlet passages connected to the ends of said cylinder, a valve for closing each inlet passage, a three-way valve, a pipe connecting the outlet of one head with one port of the three-way valve, a pipe connecting the outlet of the other head with another port of the three-way valve, a double armed lever on the three-way valve stem, operative connections between one arm of said lever and one of the inlet valves, and operative connections between the other arm of said lever and the other inlet valve, substantially as described.

In testimony that I claim the foregoing as my own, I affix my signature in presence of two witnesses.

CHARLES F. BROWN.

Witnesses:
  ALFRED B. DENT,
  W. WALLACE NAIRN, Jr.